United States Patent
Dong

(10) Patent No.: US 12,212,534 B2
(45) Date of Patent: Jan. 28, 2025

(54) COMMUNICATION METHOD AND COMMUNICATION DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 18/271,397

(22) PCT Filed: Jan. 7, 2021

(86) PCT No.: PCT/CN2021/070701
§ 371 (c)(1),
(2) Date: Jul. 7, 2023

(87) PCT Pub. No.: WO2022/147723
PCT Pub. Date: Jul. 14, 2022

(65) Prior Publication Data
US 2024/0305596 A1    Sep. 12, 2024

(51) Int. Cl.
G06F 15/16    (2006.01)
*H04L 5/00*    (2006.01)
*H04L 51/21*    (2022.01)
*H04W 74/00*    (2009.01)

(52) U.S. Cl.
CPC ............ *H04L 51/21* (2022.05); *H04L 5/0007* (2013.01); *H04W 74/006* (2013.01)

(58) Field of Classification Search
CPC .............................. H04L 5/0007; H04L 51/21

USPC .......................................................... 709/203
See application file for complete search history.

(56) References Cited

U.S. PATENT DOCUMENTS

| | | | | |
|---|---|---|---|---|
| 9,374,190 B2* | 6/2016 | Koskela | .................... | H04L 1/00 |
| 10,194,391 B2* | 1/2019 | Asterjadhi | ........ | H04W 52/0216 |
| 10,548,062 B2* | 1/2020 | Cui | ........... | H04W 8/26 |
| 10,863,501 B2* | 12/2020 | Su | .................... | H04W 72/0446 |
| 11,006,363 B2* | 5/2021 | Rajib | .................. | H04W 74/085 |
| 11,202,258 B2* | 12/2021 | Ghosh | ............... | H04W 28/0221 |
| 11,523,306 B1* | 12/2022 | Chu | ...................... | H04L 69/324 |
| 11,528,722 B2* | 12/2022 | Cavalcanti | ............ | H04W 72/12 |
| 11,910,313 B2* | 2/2024 | Rajib | .................. | H04W 74/085 |
| 2014/0153512 A1* | 6/2014 | Koskela | ................ | H04L 1/1887 370/329 |
| 2019/0021055 A1* | 1/2019 | Guo | .................. | H04W 52/0229 |

(Continued)

FOREIGN PATENT DOCUMENTS

| CN | 109644447 A1 | 4/2019 |
|---|---|---|
| CN | 111315029 A | 6/2020 |
| WO | WO 2020119734 A1 | 6/2020 |

OTHER PUBLICATIONS

European Patent Application No. 21916781.4, Search and Opinion Dec. 22, 2023, 12 pages.

(Continued)

*Primary Examiner* — Moustafa M Meky
(74) *Attorney, Agent, or Firm* — Cozen O'Connor

(57) ABSTRACT

A communication method includes: determining a first message frame, the first message frame including target wake-up time (TWT) information, and the TWT information indicating time information of sending a periodic service or an aperiodic service by a station device; and sending the first message frame.

18 Claims, 2 Drawing Sheets

(56) References Cited

U.S. PATENT DOCUMENTS

| | | | |
|---|---|---|---|
| 2019/0182864 A1 | 6/2019 | Huang et al. | |
| 2019/0274086 A1* | 9/2019 | Cui | H04W 40/28 |
| 2019/0306794 A1* | 10/2019 | Ghosh | H04W 52/0219 |
| 2020/0267644 A1* | 8/2020 | Rajib | H04W 52/0216 |
| 2021/0250860 A1* | 8/2021 | Rajib | H04W 52/0248 |
| 2022/0078706 A1* | 3/2022 | Ghosh | H04W 52/0219 |

OTHER PUBLICATIONS

Chen, Q. et al. "A Target Wake Time Scheduling Scheme for Uplink Multiuser Transmission in IEEE 802.11ax-Based Next Generation WLANs" Oct. 2019, IEEE Access, vol. 7, pp. 158207-158222.
PCT/CN2021/070701, International Search Report and Written Opinion dated Sep. 10, 2021, 2 pages.
Gan, M. (Huawei): "TWT for MLD", IEEE Draft; 11-20-1680-00-00BE-TWT-FOR-MLD, IEEE-SA Mentor, Piscataway, NJ USA, vol. 802.11 EHT; 802.11be, No. 0, Nov. 30, 2020, 7 pages.

* cited by examiner

COMMUNICATION METHOD AND COMMUNICATION DEVICE

CROSS-REFERENCE TO RELATED APPLICATION

This application is a U.S. national phase of International Application No. PCT/CN2021/070701, filed on Jan. 7, 2021, the entire content of which is incorporated herein by reference.

TECHNICAL FIELD

The disclosure relates to a field of communication, and more particularly to a communication method and a communication device in a wireless communication system.

BACKGROUND

Recent developments in Wi-Fi technologies have focused on 320 MHz bandwidth transmission, aggregation and collaboration of multiple frequency bands, etc, which is expected to increase a rate and throughput for wireless communication by at least four times compared with an existing standard. The main application scenarios are: video transmission, augmented reality (AR), virtual reality (VR), and the like.

The aggregation and cooperation of multiple frequency bands refers to performing communication between devices in frequency bands of 2.4 GHz, 5 GHz and 6 GHz simultaneously. For the communication between devices in multiple frequency bands simultaneously, it is necessary to define a new MAC (Media Access Control) mechanism for performing management. In addition, it is expected that the aggregation and coordination of multiple frequency bands will support the capability of providing a low-delay transmission.

Currently, multi-band aggregation and system technology can support a maximum bandwidth of 320 MHz (160 MHz+160 MHz), and may also support 240 MHz (160 MHz+80 MHz) and other bandwidths.

SUMMARY

According to exemplary embodiments of the disclosure, there is provided a communication method, performed by an access point, including: determining a first message frame, the first message frame including target wake-up time (TWT) information, and the TWT information indicating time information of sending a periodic service or an aperiodic service by a station device; and sending the first message frame.

According to exemplary embodiments of the disclosure, there is provided a communication method, performed by a station device, including: receiving a first message frame, the first message frame including target wake-up time (TWT) information, and the TWT information indicating time information of sending a periodic service or an aperiodic service by a station device; and performing communication operation based on the first message frame.

According to exemplary embodiments of the disclosure, there is provided an electronic device. The electronic device includes a memory, a processor, and a computer program stored on the memory and executable by the processor. When the computer program is executed by the processor, the above mentioned method is implemented.

According to exemplary embodiments of the disclosure, there is provided a computer readable storage medium. A computer program is stored on the computer readable storage medium. When the computer program is executed by a processor, the above mentioned method is implemented.

BRIEF DESCRIPTION OF THE DRAWINGS

The above and other features of embodiments of the disclosure will become more apparent by describing exemplary embodiments of the disclosure in detail with reference to accompanying drawings, in which.

DETAILED DESCRIPTION

Figure 1:
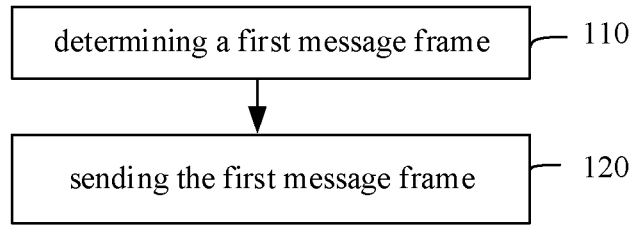
FIG. 1 is a flow chart illustrating a communication method according to an embodiment.

The following description with reference to the accompanying drawings is provided to assist in a comprehensive understanding of various embodiments of the disclosure as defined by the appended claims and their equivalents. The embodiments of the disclosure include various specific details, which are to be regarded as merely exemplary. In addition, descriptions of well-known techniques, functions, and constructions may be omitted for clarity and conciseness.

The terms and words used in the disclosure are not limited to the bibliographical meanings, but are merely used by the inventor to enable a clear and consistent understanding of the disclosure. Accordingly, for those skilled in the art, the descriptions of the embodiments of the disclosure are provided for purposes of illustration and not for purpose of limitation.

It should be understood that, unless the context clearly indicates otherwise, the singular forms "a", "one", "said" and "the" used herein may also include plural forms. It should be further understood that the term "include" as used in the disclosure refers to the presence of the described features, integers, steps, operations, components and/or assemblies, but does not exclude the presence or addition of one or more other features, integers, steps, operations, components, assemblies and/or groups thereof.

It should be further understood that, although the terms "first", "second", etc. in this description may be configured to describe various elements, these elements shall not be limited to these terms. These terms are only used to distinguish one element from another. Thus, a first element discussed below may also be referred to as a second element without departing from the teachings of exemplary embodiments.

It should be understood that when a component is "connected" or "coupled" to another component, it may be directly connected or coupled to other components, or there may be an intermediate component. In addition, the "connected" or "coupled" as used herein may include wirelessly connected or wirelessly coupled. The term "and/or" or the expression "at least one/at least one of . . . " as used herein includes any or all combinations of one or more of the associated listed items.

Unless otherwise defined, all terms (including technical and scientific terms) used herein have the same meaning as commonly understood by those skilled in the art to which the disclosure belongs.

In a wireless communication system, a basic service set (BSS) may include an access point (AP) device and one or more non-AP devices that communicate with the AP device. A basic service set may be connected to a distribution system (DS) through the AP device of the basic service set, and then connected to another basic service set to form an extended service set (ESS).

The AP device is a wireless switch for a wireless network, and also the core of the wireless network. The AP device may be configured as a wireless base station, configured as a bridge for connecting a wireless network and a wired network. With the AP device, the wired network and the wireless network may be integrated.

As an example, the AP device may include software applications and/or circuits, to enable other types of nodes in the wireless network to communicate with the outside and inside of the wireless network via the AP device. For example, the AP device may be a terminal device or a network device equipped with a Wi-Fi (Wireless Fidelity) chip.

As an example, the non-AP device may include, but is not limited to: a cellular phone, a smart phone, a wearable device, a computer, a personal digital assistants (PDA), a personal communication system (PCS) device, a personal information manager (PIM), a personal navigation device (PND), a global positioning system, a multimedia device, an Internet of Things (IoT) device, etc. Hereinafter, for convenience of description, the term "non-AP device" may be used interchangeably with an STA (station) or a non-AP STA device.

A requirement supporting a low-latency service is raised in the wireless communication technologies. However, an enhanced distributed channel access (EDCA) parameter in the related standard cannot meet the requirement of the low-latency service. There may be multiple APs usually in a wireless communication system. Therefore, a multi-AP coordination function is needed to coordinate resources (such as, SR, RTA resources, etc.) between APs, thereby meeting a requirement of low-latency services. For example, a multi-AP (access point) coordination function is added into the wireless communication technologies for coordinating resources between APs, such as, spatial reuse (SR) and utilization of real-time application (RTA) resources. However, there is no multi-AP coordination mechanism in the related standard. In addition, if a delay requirement of an RTA service is to be guaranteed, the RTA service needs to avoid interference as much as possible during transmission. For this, exemplary embodiments of the disclosure provide a communication method and a communication apparatus that meets the requirement.

FIG. 1 is a flow chart illustrating a communication method according to an embodiment. The communication method illustrated in FIG. 1 may be applied to an access point device acted as a sender.

Referring to FIG. 1, at block 110, a first message frame is determined. The first message frame may include target wake-up time (TWT) information. For example, the first message frame may be a beacon frame, an action frame, etc. However, these are only exemplary, and other types of frames for information transmission are also feasible. In embodiments of the disclosure, there may be multiple ways for determining the first message frame. For example, the access point device may generate the first message frame based on at least one of: a network situation, a load situation, a hardware capability of a sending/receiving device, a service type, and relevant specification agreements, and embodiments of the disclosure are not particularly limited thereto. In embodiments of the disclosure, the access point device may also obtain the first message frame from an external device, and embodiments of the disclosure are not particularly limited thereto.

At block 120, the first message frame is sent. The first message frame (including the TWT information) may be received by a corresponding station device or by other access point devices located in a BSS different from the BSS that includes the access point device acted as the sender, which may be described below for the two situations with reference to FIG. 3 and FIG. 4 respectively.

According to an embodiment, the TWT information may at least indicate time information of sending a periodic service or an aperiodic service by the station device. That is to say, the access point device acted as the sender may negotiate for the time information of the periodic service or the aperiodic service with a corresponding station device. According to an embodiment of the disclosure, the periodic service or the aperiodic service may be a real-time application (RTA) service.

In a case that the periodic service is sent, the TWT information may include at least one of: a periodicity of the periodic service, a duration of each cycle, and a validity period (timeliness) of the periodic service. According to an embodiment, the periodicity of the periodic service may represent a time interval between sending adjacent periodic services. The duration of each cycle may represent a duration for transmitting a single periodic service. The validity period of the periodic service may represent a valid duration for performing periodic service operations. For example, the validity duration may be in a unit of a minute, an hour, a day, a month or a year. In addition, within the first message frame, the TWT information may also include other contents, such as parameter settings for indicating TWT function control and/or negotiated TWT time points, etc.

For the periodic service, the station device may negotiate with the access point device about the periodicity, the duration and the timeliness of the periodic service. The station device may use allocated resources for transmission when the station device is to transmit the RTA service.

In an embodiment, the access point device may carry the resources allocated to the station device in the first message frame, such as a resource unit (RU), a TWT parameter, spatial reuse (SR), etc.

In another embodiment, the access point device may allocate resources to the station device via another frame (e.g., a trigger frame, etc.), for transmitting the RTA service. For example, as illustrated at block 230 of FIG. 2, a second message frame (e.g., the trigger frame, etc.) may be sent. The second message frame includes resource information allocated to the station device that is to send the periodic service or the aperiodic service.

Figure 2:
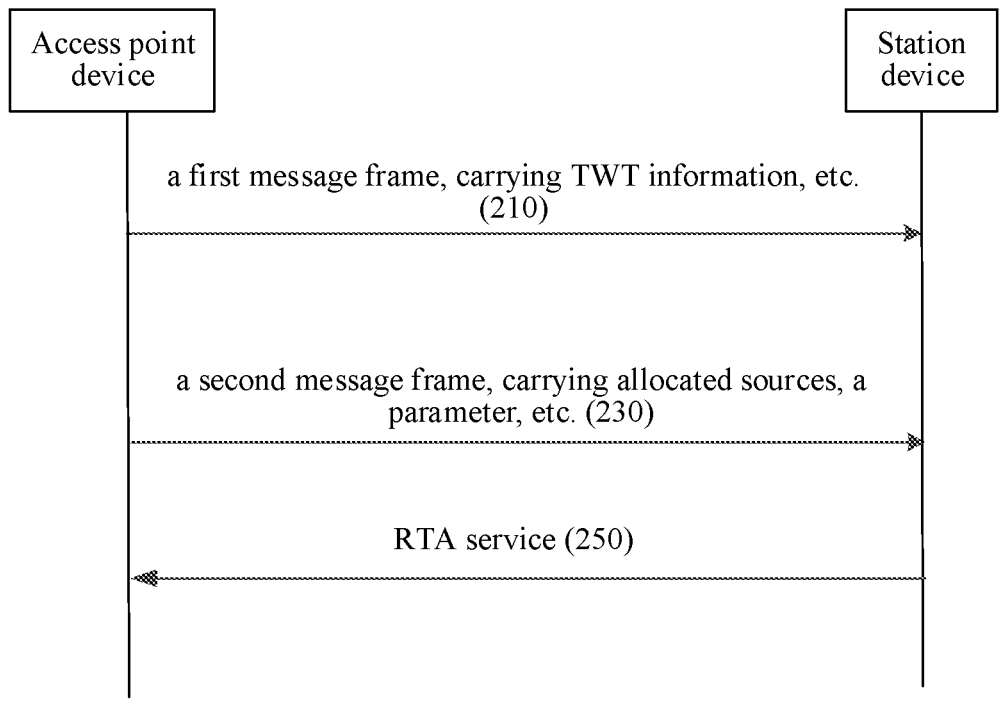
FIG. 2 is a flow chart illustrating a communication between an access point device and a station device according to an embodiment.

In addition, in the block 230 of FIG. 2, a parameter value suitable for implementing an uplink OFDMA random access (UORA) operation is allocated to the station device through the second message frame in a case that the station device that is to send the aperiodic service accesses a channel by competition. The parameter value includes a minimum value (OCWmin) and a maximum value (OCWmax) of an OFDMA contention window (OCW).

For the aperiodic service, after broadcasting the TWT information, the AP device sends the trigger frame at a negotiated TWT time point in the TWT information, and the trigger frame may include the resources allocated to the aperiodic RTA service. When the station device that is to transmit the aperiodic RTA service accesses the channel in a competitive way, such as, reusing the UORA technology, the parameters OCWmin and OCWmax may be set relatively small (for example, smaller than the UORA in the related art). In this way, the station device may obtain transmission resources more easily. Therefore, the low latency requirement can be achieved, so as to meet the latency requirement of the RTA service.

Further, the TWT information may include spatial reuse (SR) information. For example, in response to the station device having multiple antennas and having information such as supporting directional transmission and determining a power value of an overlapping basis service set (OBSS) data packet, the access point device may configure the SR information included in the TWT information, to apply to the transmission of the periodic service and the aperiodic service.

According to the embodiments of the disclosure, the station device and the access point device may be devices supporting a multi-connection communication, which may be simply referred to as a multi-link device (MLD), that is, there may be multiple connections between the station device and the access point device. The multiple connections may be at different frequencies, such as, connections at 2.4 GHz, 5 GHZ, 6 GHZ, etc., or may be several connections with a same bandwidth or different bandwidths at a specific frequency (such as, 2.4 GHz). In addition, there may be multiple channels under each connection. In this case, the TWT information may include time information for sending the periodic service or the aperiodic service under each of the multiple connections. Alternatively, the TWT information may further include a connection identifier corresponding to each of the multiple connections. With such TWT information, the access point device may negotiate with the station device about the transmission period of the periodic service or the aperiodic service under each connection.

At step 210 of FIG. 2, the access point device may send a first message frame to the station device. This step may be similar to the action at block 110 of FIG. 1. The action at step 230 described in the above embodiment may be used as a sub-operation of the communication method in FIG. 1. At step 250 of FIG. 2, the access point device may receive the periodic/aperiodic RTA service from the station device based on the transmission period negotiated.

It is described in the above embodiment that the TWT information sent by the access point device acted as the sender is received by the station device, so as to negotiate the transmission period of the periodic service or the aperiodic service with the station device. Embodiments will be described below to that other access point device may receive the first message frame sent by the access point device acted as the sender.

According to an embodiment of the disclosure, the TWT information may be included in a reduced neighbor report (RNR) information element. The RNR information element may be carried in the first message frame.

When there are multiple access point devices, other access point devices may receive the first message frame sent by the access point device that acts as the sender, such that other access point devices may obtain, based on the TWT information in the RNR information element carried in the first message frame, information such as the time point and the spatial reuse set for transmitting the RTA service by the access point device acted as the sender. Other access point devices plan, based on such information received, the time point and spatial reuse for transmitting the RTA service in the BSS. That is to say, the multiple AP devices may directly coordinate a communication period of the RTA service. The communication period includes the SR (spatial reuse), the period information, etc.

According to embodiments of the disclosure, although not shown, the communication method illustrated in FIG. 1 may further include: broadcasting the first message frame by a first access point device. The first message frame is received by a second access point device different from the first access point device. The first access point device may be the access point device acted as the sender as described above, and the second access point device may be an access point device located in other BSSs.

According to embodiments of the disclosure, in a case that the first access point device and the second access point device support a simultaneous transmission and reception (STR) function, a transmission period of the periodic service is overlapped with a transmission period of the aperiodic service under different connections in the multiple connections supported by the first access point device and the second access point device. The transmission period of the periodic service is not overlapped with the transmission period of the aperiodic service under the same connection in the multiple connections supported by the first access point device and the second access point device.

For example, the first access point device is represented by AP1, and the second access point device is represented by AP2, and they belong to different multi-connected devices respectively. The first access point device AP1 communicates with a station device STA1, and the second access point device AP2 communicates with a station device STA2. In a case that the first access point device AP1 and the second access point device AP2 have the STR function, the RTA service periods under different connections may overlap, but the RTA service periods under the same connection does not overlap. According to embodiments of the disclosure, the same connection represents that the access point devices operates in a same operating frequency band but belong to different MLDs. In addition, if the RTA service periods overlap under different connections, it may be determined whether the STA device supports the STR function, to ensure that an acknowledgement message frame (ACK) returned to the station device by the access point device is not disturbed.

Figure 3:
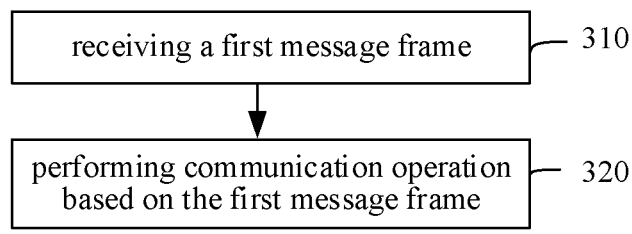
FIG. 3 is a flow chart illustrating a communication method according to another embodiment.

FIG. 3 is a flow chart illustrating a communication method according to another embodiment. The communication method illustrated in FIG. 3 may be applied to a station device.

Referring to FIG. 3, at block 310, a first message frame may be received. The first message frame may be sent from an access point device acted as a sender. The first message frame may include target wake-up time (TWT) information. The TWT information at least indicates time information of sending a periodic service or an aperiodic service by the station device. The periodic service or aperiodic service may be a periodic real-time application (RTA) service or an aperiodic RTA service.

Description will be made below to embodiments where the communication method illustrated in FIG. 3 is applied to a station device. That is, at block 310, the station device receives the first message frame.

For the periodic service, the station device may negotiate with the AP device about a periodicity, a duration and a timeliness of the periodic service. When the station device is to transmit the RTA service, the station device may perform transmission using allocated resources. For example, the station device may receive a second message frame (e.g., a trigger frame). The second message frame may include resource information allocated to the station device that is to send the periodic service.

For the aperiodic service, after broadcasting the TWT information, the AP device sends the second message frame (e.g., the trigger frame) to the station device at a TWT time point, and the trigger frame includes the resources allocated to the aperiodic RTA service. If the station device that is to transmit the RTA service accesses a channel in a competitive way, such as in a way of reusing UORA, the station device may obtain parameters suitable for implementing the UORA operation from the second message frame (such as, the trigger frame), for example, obtaining OCWmin and OCWmax. According to embodiments of the disclosure, the OCWmin and OCWmax obtained are smaller than the UORA in the related art, thus the station device may obtain the transmission resources more easily.

According to embodiments of the disclosure, the TWT information may include spatial reuse information. When the station device supports directional transmission, the SR information may be obtained from the TWT information for the periodic service and the aperiodic service.

According to embodiments of the disclosure, the station device may be a multi-connection device supporting multi-connection communication. In this case, the TWT information may include time information of sending the periodic service or the aperiodic service under each of multiple connections and/or a connection identifier corresponding to each of the multiple connections.

In FIG. 3, the first message frame, the TWT information and the second message frame may be similar to those described with reference to FIG. 1 and FIG. 2, and repeated descriptions are omitted here for conciseness.

At block 320, the station device may perform communication operation based on the first message frame. For example, the station device performs the RTA service transmission under one or more connections based on negotiated time information of the periodic/aperiodic RTA service.

Figure 4:
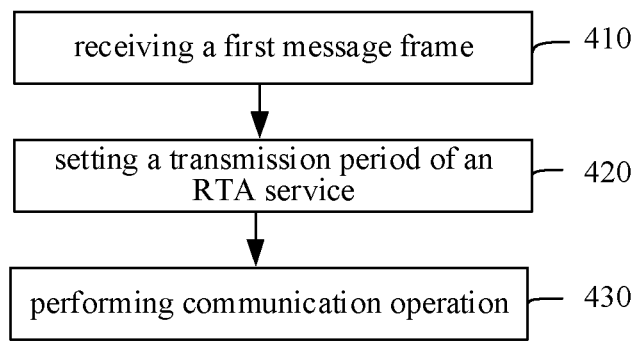
FIG. 4 is a flow chart illustrating a communication method according to another embodiment.

FIG. 4 is a flow chart illustrating a communication method according to another embodiment. The communication method illustrated in FIG. 4 may be applied to an access point device acted as a receiver (such as, the second access point device).

At block 410, the second access point device may receive a first message frame broadcast by a first access point device different from the second access point device. According to embodiments, the first message frame may include TWT information. The TWT information may at least indicate time information of sending a periodic service or an aperiodic service by a station device that communicates with the first access point device.

At block 420, the second access point device may set, based on the TWT information in the first message frame, a transmission period for the periodic service or the aperiodic service of the station device communicating with the second access point device. According to embodiments of the disclosure, the TWT information may be included in a reduced neighbor report (RNR) information element, so that the second access point device may obtain the TWT information from the RNR information element.

According to embodiments of the disclosure, in a case that the first access point device and the second access point device support a simultaneous transmission and reception (STR) function, a transmission period of the periodic service is overlapped with a transmission period of the aperiodic service under different connections in multiple connections supported by the first access point device and the second access point device. The transmission period of the periodic service is not overlapped with the transmission period of the aperiodic service under the same connection in the multiple connections supported by the first access point device and the second access point device.

At block 430, the second access point device may perform communication operation with a corresponding station device. For example, the periodic service or the aperiodic service may be transmitted based on a transmission period set for the RTA service.

In an embodiment of the disclosure, the TWT information may be nested in the RNR information element, and the RNR information element may be included in, such as, a beacon frame (i.e., the first message frame). In a case that other AP devices (i.e., the second access point device) receives the beacon frame broadcast by the AP device (i.e., the first access point device), the other AP devices (i.e., the second access point device) may plan, based on information in the RNR information element, a time point, spatial reuse, etc., of transmitting the RTA service of the station device in this BSS.

For example, STA1 and AP1, STA2 and AP2 belong to different MLDs. When the AP1 and AP2 have the STR function, the RTA service periods in the respective connections may overlap, but the RTA service periods in the same connection do not overlap. When the RTA service periods overlap under different connections, it may be determined whether the STA device supports the STR function, to ensure that an acknowledgement message frame (ACK) returned by the access point device to the station device is not disturbed.

With the communication method according to the embodiments of the disclosure, the access point device may directly coordinate the communication time information of the RTA service, including the SR, the period information, etc., thereby improving the utilization efficiency of the frequency spectrum and meeting the delay requirement of the RTA service.

It should be understood that, although the steps in the flowcharts of FIGS. 1 to 4 are illustrated in sequence as indicated by arrows, these steps are not necessarily executed in sequence as indicated by arrows. Unless explicitly stated herein, the execution of these steps is not strictly limited in order, and these steps can be executed in other orders. In addition, at least a part of the steps in the flowchart of the accompany drawings may include multiple sub-steps or stages, which may not necessarily be completed at the same time point, but may be executed at different time points. An execution order of the multiple sub-steps or stages may not necessarily be sequential, but may be executed alternately with other steps, or at least a part of sub-steps or stages in other steps. In addition, the steps in different flowcharts may also be combined.

Figure 5:
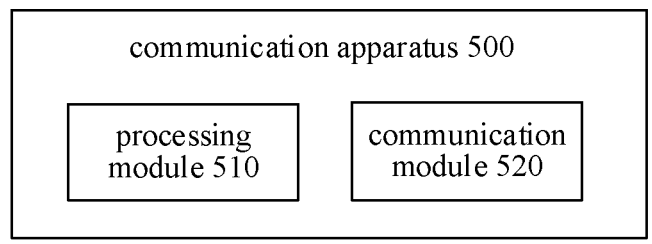
FIG. 5 is a block diagram illustrating a communication apparatus according to an embodiment.

FIG. 5 is a block diagram illustrating a communication apparatus 500 according to an embodiment. The communication apparatus 500 may include a processing module 510 and a communication module 520.

The communication apparatus 500 illustrated in FIG. 5 may be applied to an access point device acted as a sender. The processing module 510 may be configured to determine a first message frame. The first message frame includes target wake-up time (TWT) information. The TWT information at least indicates time information of sending a periodic service or an aperiodic service by a station device. The communication module 520 is configured to send the first message frame. In this case, the processing module 510 and the communication module 520 in the communication apparatus 500 may perform the communication method with reference to FIG. 1, and repeated descriptions are omitted for conciseness.

The communication apparatus 500 illustrated in FIG. 5 may be applied to a station device. The communication module 520 may be configured to receive a first message frame. The first message frame includes target wake-up time (TWT) information. The TWT information at least indicates time information of sending a periodic service or an aperiodic service by a station device. The processing module 510 is configured to control the communication muddle 520 to perform communication operation based on the first message frame. In this case, the processing module 510 and the communication module 520 in the communication apparatus 500 may perform the communication method with reference to FIG. 3, and repeated descriptions are omitted for conciseness.

The communication apparatus 500 illustrated in FIG. 5 may be applied to an access point device acted as a receiver (such as the second access point device described above). The communication module 520 may be configured to receive a first message frame broadcast by a first access point device different from the second access point device. The first message frame includes target wake-up time (TWT) information. The TWT information at least indicates time information of sending a periodic service or an aperiodic service by a station device. The processing module 510 may be configured to set, based on the TWT information in the first message frame, a transmission period of a periodic service or an aperiodic service of the station device communicating with the second access point device, and to control the communication module 520 to perform communication operation. In this case, the processing module 510 and the communication module 520 in the communication apparatus 500 may perform the communication method with reference to FIG. 4, and repeated descriptions are omitted for conciseness.

In addition, the communication apparatus 500 illustrated in FIG. 5 is only exemplary, and embodiments of the disclosure are not limited thereto. For example, the communication apparatus 500 may also include other modules, such as a memory module. In addition, various modules in the communication apparatus 500 may be combined into a more complex module or may be divided into more individual modules.

With the communication apparatus according to embodiments of the disclosure, the utilization efficiency of the frequency spectrum is improved and the delay requirement of the RTA service is met.

Based on the same principles as the methods according to embodiments of the disclosure, embodiments of the disclosure further provide an electronic device. The electronic device includes a processor and a memory. The memory stores machine-readable instructions (or may referred to as a "computer program"). The processor is configured to execute the machine-readable instructions to implement the methods described with reference to FIGS. 1 to 4.

Embodiments of the disclosure also provide a computer-readable storage medium. A computer program is stored on the computer-readable storage medium. When the computer program is executed by a processor, the methods described with reference to FIGS. 1 to 4 are implemented.

In an exemplary embodiment, the processor may be configured to implement or execute various exemplary logical blocks, modules and circuits described in connection with the present disclosure, for example, a central processing unit (CPU), a general processor, a digital signal processor (DSP), an application specific integrated circuit (ASIC), a field programmable gate array (FPGA), or other programmable logic devices, transistor logic devices, hardware components or any combination thereof. The processor may also be a combination used to implement a computing function, for example, a combination including one or more microprocessors, or a combination including DSPs and microprocessors.

In an exemplary embodiment, the memory may be, for example, a read only memory (ROM), a random access memory (RAM), an electrically erasable programmable read only memory (EEPROM), a compact disc read only memory (CD-ROM) or other optical disc memories, optical disk memories (including a compact disc, a laser disc, an optical disc, a digital general disc, a Blu-ray disc and the like), disk storage mediums or other magnetic storage devices, or any other medium that can be used to carry or store program codes in the form of instructions or data structures and can be accessed by a computer, which is not limited herein.

Respective aspects of the disclosure may address at least the above-mentioned problems and/or defects. The following technical solution is provided by respective embodiments of the disclosure.

According to an embodiments of the disclosure, a communication method is provided. The communication method includes: determining a first message frame, in which the first message frame includes target wake-up time (TWT) information, and the TWT information at least indicates time information of sending a periodic service or an aperiodic service by a station device; and sending the first message frame.

In an embodiment, in a case that the periodic service is sent, the TWT information includes at least one of: a periodicity of the periodic service, a duration of each cycle, or a validity period of the periodic service.

In an embodiment, the communication method further includes: sending a second message frame, in which the second message frame includes resource information allocated to the station device that is to send the periodic service or the aperiodic service.

In an embodiment, the communication method further includes: allocating, through the second message frame, a parameter value suitable for implementing an uplink orthogonal frequency-division multiple access (OFDMA) random access (UORA) operation to the station device in a case that the station device that is to send the aperiodic service accesses a channel by competition.

In an embodiment, the parameter value includes a minimum value and a maximum value of an OFDMA contention window (OCW).

In an embodiment, the TWT information includes spatial reuse information.

In an embodiment, the TWT information includes time information of sending the periodic service or the aperiodic service in each of a plurality of connections.

In an embodiment, the TWT information further includes a connection identifier corresponding to each of the plurality of connections.

In an embodiment, the TWT information is included in a reduced neighbor report (RNR) information element.

In an embodiment, the communication method further includes: broadcasting the first message frame by a first access point device, in which the first message frame is received by a second access point device different from the first access point device.

In an embodiment, in a case that the first access point device and the second access point device support a simultaneous transmission and reception (STR) function, a transmission period of the periodic service is overlapped with a transmission period of the aperiodic service under different connections in a plurality of connections supported by the first access point device and the second access point device.

In an embodiment, the transmission period of the periodic service is not overlapped with the transmission period of the aperiodic service under a same connection in the plurality of connections supported by the first access point device and the second access point device.

In an embodiment, the periodic service or aperiodic service is a real-time application (RTA) service.

According to an embodiments of the disclosure, a communication method is provided. The communication method includes: receiving a first message frame, in which the first message frame includes target wake-up time (TWT) information, and the TWT information at least indicates time information of sending a periodic service or an aperiodic service by a station device; and performing communication operation based on the first message frame.

In an embodiment, in a case that the periodic service is sent, the TWT information includes at least one of: a periodicity of the periodic service, a duration of each cycle, or a validity period of the periodic service.

In an embodiment, the communication method further includes: receiving a second message frame, in which the second message frame includes resource information allocated to the station device that is to send the periodic service or the aperiodic service.

In an embodiment, the communication method further includes: obtaining, from the second message frame, an allocated parameter value suitable for implementing an uplink orthogonal frequency-division multiple access (OFDMA) random access (UORA) operation in a case that the station device that is to send the aperiodic service accesses a channel by competition.

In an embodiment, the parameter value includes a minimum value and a maximum value of an OFDMA contention window (OCW).

In an embodiment, the TWT information includes spatial reuse information.

In an embodiment, the TWT information includes time information of sending the periodic service or the aperiodic service in each of a plurality of connections.

In an embodiment, the TWT information further includes a connection identifier corresponding to each of the plurality of connections.

In an embodiment, the TWT information is included in a reduced neighbor report (RNR) information element.

In an embodiment, the communication method further includes: receiving, by a second access point device, the first message frame broadcasted by a first access point device different from the second access point device; and setting, by the second access point device, a transmission period of the periodic service or the aperiodic service sent by a station device communicating with the second access point device based on the TWT information in the first message frame.

In an embodiment, in a case that the first access point device and the second access point device support a simultaneous transmission and reception (STR) function, the transmission period of the periodic service is overlapped with the transmission period of the aperiodic service under different connections in a plurality of connections supported by the first access point device and the second access point device.

In an embodiment, the transmission period of the periodic service is not overlapped with the transmission period of the aperiodic service under a same connection in the plurality of connections supported by the first access point device and the second access point device.

In an embodiment, the periodic service or aperiodic service is a real-time application (RTA) service.

According to an embodiments of the disclosure, a communication apparatus is provided. The communication apparatus includes: a processing module, configured to determine a first message frame, in which the first message frame includes target wake-up time (TWT) information, and the TWT information at least indicates time information of sending a periodic service or an aperiodic service by a station device; and a communication module, configured to send the first message frame.

According to an embodiments of the disclosure, a communication apparatus is provided. The communication apparatus includes: a communication module, configured to receive a first message frame, in which the first message frame includes target wake-up time (TWT) information, and the TWT information at least indicates time information of sending a periodic service or an aperiodic service by a station device; and a processing module, configured to control the communication module to perform communication operation based on the first message frame.

According to an embodiments of the disclosure, an electronic device is provided. The electronic device includes: a memory, a processor, and a computer program stored in the memory and executable by the processor, in which the communication method according to any of above embodiments is implemented when the processor executes the computer program.

According to an embodiments of the disclosure, a computer storage medium having a computer program stored thereon is provided. The method according to any of above embodiments is implemented when the computer program is executed by a processor.

Although the disclosure has been illustrated and described with reference to certain embodiments of the disclosure, it will be understood by those skilled in the art that various changes in form and details may be made without departing from the scope of the disclosure. Therefore, the scope of the disclosure should not be limited by the embodiments, but should be defined by the appended claims and their equivalents.

What is claimed is:

1. A communication method, performed by an access point, comprising:
    determining a first message frame, wherein the first message frame comprises target wake-up time (TWT) information, and the TWT information indicates time information of sending a periodic service or an aperiodic service by a station device;
    sending the first message frame; and
    sending a second message frame, wherein the second message frame comprises resource information allocated to the station device that is to send the periodic service or the aperiodic service.

2. The communication method of claim 1, wherein, the periodic service is sent, and the TWT information comprises at least one of: a time interval between sending adjacent periodic services, a duration for transmitting a single periodic service, or a validity period of the periodic service.

3. The communication method of claim 1, wherein the communication method further comprises:
  determining that the station device that is to send the aperiodic service accesses a channel by competition, allocating, through the second message frame, a parameter value suitable for implementing an uplink orthogonal frequency-division multiple access (OFDMA) random access (UORA) operation to the station device;
  wherein the parameter value comprises a minimum value and a maximum value of an OFDMA contention window (OCW).

4. The communication method of claim 1, wherein the TWT information comprises spatial reuse information, or time information of sending the periodic service or the aperiodic service in each of a plurality of connections.

5. The communication method of claim 4, wherein the TWT information comprises the time information of sending the periodic service or the aperiodic service in each of the plurality of connections, and the TWT information further comprises a connection identifier corresponding to each of the plurality of connections.

6. The communication method of claim 1, wherein the TWT information is comprised in a reduced neighbor report (RNR) information element.

7. The communication method of claim 6, wherein the communication method further comprises:
  broadcasting the first message frame by a first access point device, wherein the first message frame is received by a second access point device different from the first access point device.

8. The communication method of claim 7, wherein, the first access point device and the second access point device support a simultaneous transmission and reception (STR) function, perform at least one of:
  a transmission period of the periodic service is overlapped with a transmission period of the aperiodic service under different connections in a plurality of connections supported by the first access point device and the second access point device, or
  the transmission period of the periodic service is not overlapped with the transmission period of the aperiodic service under a same connection in the plurality of connections supported by the first access point device and the second access point device.

9. A communication method, performed by a station device, comprising:
  receiving a first message frame, wherein the first message frame comprises target wake-up time (TWT) information, and the TWT information indicates time information of sending a periodic service or an aperiodic service by the station device;
  performing communication operation based on the first message frame; and
  receiving a second message frame, wherein the second message frame comprises resource information allocated to the station device that is to send the periodic service or the aperiodic service.

10. The communication method of claim 9, wherein, the periodic service is sent, and the TWT information comprises at least one of: a time interval between sending adjacent periodic services, a duration for transmitting a single periodic service, or a validity period of the periodic service.

11. The communication method of claim 9, wherein the communication method further comprises:
  determining that the station device that is to send the aperiodic service accessing a channel by competition, obtaining, from the second message frame, an allocated parameter value suitable for implementing an uplink orthogonal frequency-division multiple access (OFDMA) random access (UORA) operation;
  wherein the parameter value comprises a minimum value and a maximum value of an OFDMA contention window (OCW).

12. The communication method of claim 9, wherein the TWT information comprises spatial reuse information or time information of sending the periodic service or the aperiodic service in each of a plurality of connections.

13. The communication method of claim 12, wherein the TWT information comprises the time information of sending the periodic service or the aperiodic service in each of the plurality of connections, and the TWT information further comprises a connection identifier corresponding to each of the plurality of connections.

14. The communication method of claim 9, wherein the TWT information is comprised in a reduced neighbor report (RNR) information element.

15. The communication method of claim 14, wherein the communication method further comprises:
  receiving, by a second access point device, the first message frame broadcasted by a first access point device different from the second access point device; and
  setting, by the second access point device, a transmission period of the periodic service or the aperiodic service sent by a station device communicating with the second access point device based on the TWT information in the first message frame.

16. The communication method of claim 15, wherein, the first access point device and the second access point device support a simultaneous transmission and reception (STR) function, perform at least one of:
  the transmission period of the periodic service is overlapped with the transmission period of the aperiodic service under different connections in a plurality of connections supported by the first access point device and the second access point device, or
  the transmission period of the periodic service is not overlapped with the transmission period of the aperiodic service under a same connection in the plurality of connections supported by the first access point device and the second access point device.

17. An electronic device, comprising: a memory, a processor, and a computer program stored in the memory and executable by the processor, wherein the communication method of claim 9 is implemented when the processor executes the computer program.

18. An electronic device, comprising: a memory, a processor, and a computer program stored in the memory and executable by the processor, wherein a communication method is implemented when the processor executes the computer program, the communication method comprising:
  determining a first message frame, wherein the first message frame comprises target wake-up time (TWT) information, and the TWT information indicates time information of sending a periodic service or an aperiodic service by a station device;
  sending the first message frame; and
  sending a second message frame, wherein the second message frame comprises resource information allocated to the station device that is to send the periodic service or the aperiodic service.

* * * * *